(12) United States Patent
Butler et al.

(10) Patent No.: US 6,680,727 B2
(45) Date of Patent: Jan. 20, 2004

(54) METHOD AND APPARATUS FOR CANCELING PILOT INTERFERENCE IN A CDMA COMMUNICATION SYSTEM

(75) Inventors: Brian K. Butler, La Jolla, CA (US);
Haitao Zhang, San Diego, CA (US);
Paul E. Bender, San Diego, CA (US);
Yu-Cheun Jou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 146 days.

(21) Appl. No.: 09/966,256

(22) Filed: Sep. 27, 2001

(65) Prior Publication Data

US 2002/0131479 A1 Sep. 19, 2002

Related U.S. Application Data

(60) Provisional application No. 60/240,823, filed on Oct. 17, 2000.

(51) Int. Cl.[7] .......................... H04B 15/00; H04K 1/00; H04L 27/30
(52) U.S. Cl. ...................... 345/147; 375/144; 375/148; 375/346
(58) Field of Search ................................ 375/147, 144, 375/148, 346

(56) References Cited

U.S. PATENT DOCUMENTS

| | | | | |
|---|---|---|---|---|
| 5,812,600 A | * | 9/1998 | Hess et al. .................. | 375/261 |
| 6,034,986 A | * | 3/2000 | Yellin ......................... | 375/346 |
| 6,067,292 A | | 5/2000 | Huang et al. ............... | 370/342 |
| 6,081,548 A | * | 6/2000 | Saito ........................... | 375/130 |

* cited by examiner

Primary Examiner—Mohammad H. Ghayour
(74) Attorney, Agent, or Firm—Philip R. Wadsworth; Charles D. Brawn; George C. Pappas

(57) ABSTRACT

Techniques for canceling pilot interference in a wireless (e.g., CDMA) communication system. A received signal typically includes a number of signal instances (i.e., multipaths). For each multipath desired to be processed, the other multipaths act as interference on the desired multipath. If the pilot is generated based on a known data pattern (e.g., all zeros) and covered with a known channelization code (e.g., a Walsh code of zero), then the pilot in an interfering multipath may be estimated as the spreading sequence at a time offset corresponding to the arrival time of that multipath. The pilot interference from each interference multipath may be estimated based on the spreading sequence for the interfering multipath and the despreading sequence for the desired multipath. The total pilot interference from a number of interfering multipaths may be subtracted from the data component in the desired multipath to provide pilot-canceled data having improved performance.

11 Claims, 10 Drawing Sheets

US 6,680,727 B2

METHOD AND APPARATUS FOR CANCELING PILOT INTERFERENCE IN A CDMA COMMUNICATION SYSTEM

RELATED APPLICATIONS

This application claims the benefit of provisional U.S. Application Ser. No. 60/240,823, entitled "METHOD AND SYSTEM FOR PILOT SIGNAL INTERFERENCE CANCELLATION IN A CDMA COMMUNICATION SYSTEM," filed Oct. 17, 2000, which is incorporated herein by reference in its entirety for all purposes.

BACKGROUND

1. Field

The present invention relates generally to data communication, and more specifically to techniques for canceling interference due to pilot in a wireless (e.g., CDMA) communication system.

2. Background

Wireless communication systems are widely deployed to provide various types of communication such as voice, packet data, and so on. These systems may be based on code division multiple access (CDMA), time division multiple access (TDMA), or some other multiple access technique. CDMA systems may provide certain advantages over other types of systems, including increased system capacity. A CDMA system is typically designed to implement one or more standards, such as IS-95, cdma2000, IS-856, and W-CDMA standards, all of which are known in the art.

In a wireless (e.g., CDMA) communication system, a pilot is often transmitted from a transmitter unit (e.g., a base station) to a receiver unit (e.g., a terminal) to assist the receiver unit perform a number of functions. The pilot may be used at the receiver unit for synchronization with the timing and frequency of the transmitter unit, estimation of the quality of the communication channel, coherent demodulation of a data transmission, and possibly other functions. The pilot is typically generated based on a known data pattern (e.g., a sequence of all zeros) and using a known signal processing scheme (e.g., covered with a particular Walsh code and spread with a known pseudo-noise (PN) sequence). For IS-95 and cdma2000 systems, each base station is assigned a specific offset for its PN sequence to uniquely identify its code channels from those of other base stations. In this way, the pilots from different base stations can be identified by their different assigned PN offsets.

At the receiver unit, a rake receiver is often used to recover the transmitted pilot, signaling, and traffic data. A transmitted signal may be received via multiple signal paths, and each received signal instance (or multipath) of sufficient strength may be assigned to and processed by a respective finger processor of the rake receiver. Each finger processor processes the assigned multipath in a manner complementary to that performed at the transmitter unit to recover the data and pilot in this multipath. The recovered pilot has an amplitude and phase determined by, and indicative of, the channel response for the multipath. The pilot is typically used for coherent demodulation of various traffics transmitted along with the pilot, which are similarly distorted by the channel response. The pilots for a number of multipaths are also used to combine demodulated symbols derived from these multipaths to obtain combined symbols having improved quality.

On the forward link, the multipaths from the same base station or cell (intra-cell) and the multipaths from other base stations (inter-cell) create interference when demodulating a CDMA signal. In fact, a substantial portion of the interference on any particular multipath may be from the pilots in the other multipaths included in the received signal. This pilot interference can degrade performance (e.g., higher error rate).

There is therefore a need for techniques to cancel interference due to pilot in a wireless (e.g., CDMA) communication system.

SUMMARY

Aspects of the present invention provide techniques for canceling pilot interference in a wireless (e.g., CDMA) communication system. A received signal typically includes a number of signal instances (i.e., multipaths). For each multipath to be processed (i.e., each desired multipath), the other multipaths are effectively interfering multipaths that act as interference to the desired multipath. If the pilot is generated based on a known data pattern (e.g., a sequence of all zeros) and covered with a known channelization code (e.g., a Walsh code of zero), then the pilot in an interfering multipath may be estimated as simply the spreading sequence at a time offset corresponding to the arrival time of that multipath at the receiver. The pilot interference from each interference multipath may be estimated based on the spreading sequence for the interfering multipath and the despreading sequence for the desired multipath. The total pilot interference from a number of interfering multipaths may be subtracted from the data component (or data signal) in the desired multipath to provide pilot-canceled data having improved performance.

In one specific embodiment, a method is provided for canceling pilot interference at a receiver unit that receives first and second pilot signals and first and second data signals. In accordance with the method, a first PN sequence corresponding to the first pilot signal is generated and despread with a second PN sequence corresponding to the second pilot signal. The despread first PN sequence is then multiplied with an estimated gain and phase of the first pilot signal to generate a first multiplied signal, which represents the estimated interference from the first pilot signal on the second data signal. The first multiplied signal is then subtracted from the second data signal. Similar processing may be performed for the second pilot signal and first data signal.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
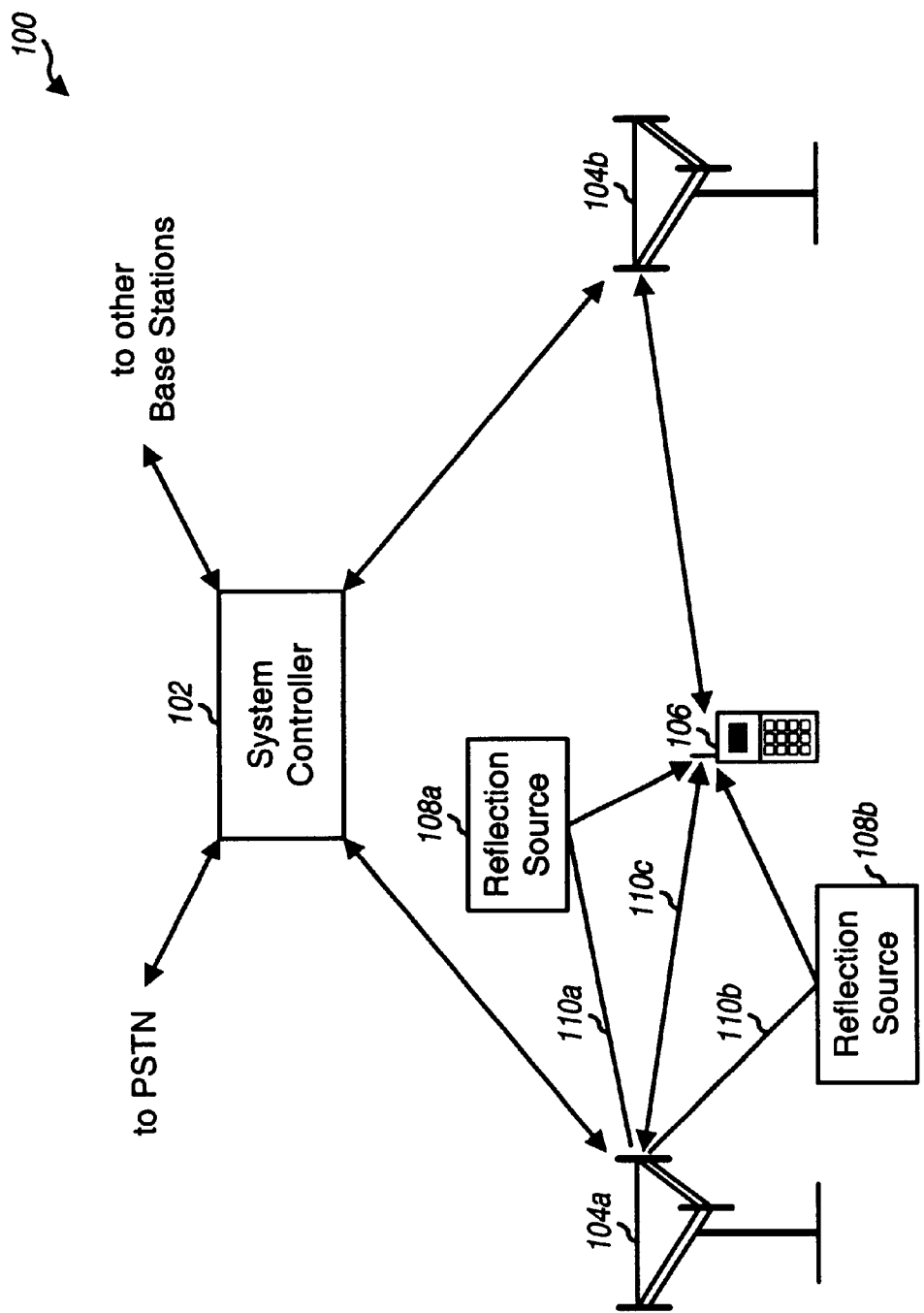
FIG. 1 is a diagram of a wireless communication system that supports a number of users and is capable of implementing various aspects and embodiments of the invention.

The techniques described herein for canceling pilot interference may be advantageously used in various wireless communication systems that transmit a pilot along with data. For example, these techniques may be used for various CDMA systems (e.g., IS-95, cdma2000, W-CDMA, and so on), Personal Communication Services (PCS) systems (e.g., ANSI J-STD-008), and others. The techniques described herein may be used to cancel pilot interference in cases where multiple instances of a single transmitted signal are received and processed (e.g., by a rake receiver) and also in cases where multiple transmitted signals are received and processed. For clarity, various aspects and embodiments of the invention are described specifically for a forward link transmission in an IS-95 CDMA system.

A forward link modulated signal in IS-95 and cdma2000 can be generated by (1) spreading a data signal with a spreading sequence, (2) matched filtering the spread signal, and (3) frequency upconverting the filtered signal to the desired radio frequency (RF). The forward link modulated signal, x(t), from a base station can be expressed as:

$$x(t) = \text{Real}\left\{\left[\left\{\frac{d(t)q(t)}{T_c}\text{Ш}\left(\frac{t}{T_c}\right)\right\} \otimes h_{tx}(t)\right]e_{tx}(t)\right\}, \quad \text{Eq (1)}$$

where
- d(t) is a continuous-time representation of the aggregate data being transmitted from the base station on all code channels;
- q(t) is a continuous-time representation of a complex spreading sequence (e.g., q(t)=IPN(t)–jQPN(t) for IS-95 and cdma2000, where IPN and QPN are the non-return to zero, {±1}, real-valued representations of the pseudo-noise (PN) sequences defined by the CDMA standard);
- $h_{tx}(t)$ is the impulse response of the transmit filter;
- $e_{tx}(t)$ is the frequency upconversion carrier signal (i.e., $e_{tx}(t)=e^{jw_ct}=\cos(w_ct)+j\sin(w_ct)$);
- $T_c$ is the time duration of a PN chip, which is also the sampling interval for purposes of the PN chip pulse shape filter definition;
- ⓧ represents a convolution operation; and
- ⊗(x) represents a continuous-time impulse train, which is also known as the sampling function.

The impulse train, which is represented by the notation of a Cyrillic letter "shah" ⊗, is defined as:

$$\text{Ш}(x) \equiv \sum_{n=-\infty}^{+\infty} \delta(x-n), \quad \text{Eq (2)}$$

or for a unit sample every T seconds, then $$\left|\frac{1}{T}\right| \cdot \text{Ш}\left(\frac{x}{T}\right) = \sum_{n=-\infty}^{+\infty} \delta(x-nT).$$

The aggregate data, d(t), can be expressed as:

$$d(t) = \sum_{n=1}^{N_C}\left\{\sqrt{\frac{E_{c,n}}{\int h_{tx}^2(\lambda)d\lambda}} \cdot u_n(t)W_n(t)\right\}, \quad \text{Eq (3)}$$

where
- $E_{c,n}$ is the energy-per-chip of the data on code channel n;
- $u_n(t) \in \{\pm 1\}$ is a continuous-time representation of the BPSK data for IS-95 for code channel n;

$$u_n(t) \in \left\{\pm\frac{1+j}{\sqrt{2}}, \pm\frac{1-j}{\sqrt{2}},\right\}$$

is a continuous-time representation of the QPSK data for cdma2000 for code channel n;
- $W_n(t)$ is a continuous-time non-return to zero, {±1}, representation of the Walsh code for code channel n;
- $\int h_{tx}^2(\lambda)d\lambda$ is the energy of the transmit matched filter; and
- $N_C$ is the total number of code channels used by the base station.

In a practical system, d(t), q(t), $u_n(t)$, and $W_n(t)$ are streams of discrete-time samples. However, these streams are expressed using continuous-time representations herein.

The forward link modulated signal, x(t), is transmitted over a communication link and is typically received at a terminal via multiple signal paths. The received signal, y(t), can thus include multiple signal instances (or multipaths) and can be expressed as:

$$y(t) = \sum_i p_i(t)x(t-t_i) + n(t), \quad \text{Eq (4)}$$

where
the summation $$\sum_i$$

is for all multipaths in the received signal;
- $t_i$ is the arrival time of the i-th multipath relative to the time the forward link modulated signal, x(t), is transmitted;
- $p_i(t)$ represents the channel gain and phase for the i-th multipath and is a function of the fading process; and
- n(t) represents the real-valued channel noise at RF plus internal receiver noise.

The received signal, y(t), is then conditioned (e.g., pre-filtered and amplified, frequency downconverted, and matched filtered) to generate a conditioned signal, s(t), which can be expressed as:

$$s(t) = [y(t)e_{rx}(t)g(t)] \otimes h_{rx}(t)$$

$$= \left[\sum_i p_i(t)x(t-t_i)e_{rx}(t)g(t)\right] \otimes h_{rx}(t) + n'(t)$$

$$= \left[\sum_i p_i(t)e_{rx}(t)g(t) \cdot \right.$$

$$\left. \text{Real}\left[\left\{\frac{d(t-t_i)q(t-t_i)}{T_c} \text{III}\left(\frac{t-t_i}{T_c}\right)\right\} \otimes h_{tx}(t)\right]e_{tx}(t-t_i)\right] \otimes h_{rx}(t)$$

$$= \frac{1}{2}\left[\sum_i \sum_{n=-\infty}^{\infty} p_i(t)g(t)e(t_i,\phi)d(nT_c)q(nT_c)R(t-t_i-nT_c)\right] + n'(t) \quad \text{Eq (5)}$$

where g(t) is the total complex gain for the conditioning of the received signal at the terminal;

$T_c$ is the time duration of a PN chip;

$e(t_i,\phi)$ is the phase offset for the i-th multipath, where $\phi$ is the carrier phase offset of the terminal;

$R(t_i)$ is the cross-correlation between the transmit and receive matched filters with a time offset of $t_i$ between the filters; and n'(t) is the noise in filtered complex baseband form.

The phase offset, $e(t_i,\phi)$, for the i-th multipath can be expressed as:

$$e(t_i,\phi) = e_{tx}(t-t_i)e_{rx}(t) = e^{-jw_c t_i}e^{j\phi}, \quad \text{Eq (6)}$$

where it is implicitly assumed that $e_{rx}(t) = e^{-jw_c t + j\phi}$ and $e^{-jw_c t_i}$ is the phase shift of the multipath fading process for the i-th multipath.

For simplicity, the receive filter is assumed to be matched to the transmit filter, i.e., $h_{tx}(t) = h_{rx}(t) = h(t)$. The matched filter cross-correlation, $R(\tau)$, can be expressed as:

$$R(\tau) = \int h(t+\tau)h(t)dt. \quad \text{Eq (7)}$$

$R(\tau)$ has a maximum value at $\tau=0$, i.e., the desired sampling point of a digital receiver.

The conditioned signal, s(t), is then sampled and further digitally processed. A rake receiver that includes a number of finger processors (or simply, fingers) is typically used to digitally process the data samples. Each finger of the rake receiver may be assigned to process a particular multipath in the received signal. The digital signal processing for each finger includes despreading the data samples with a PN sequence having an offset matched to the arrival time of the multipath being processed.

The despread signal, $z_j(t)$, for the j-th finger may be expressed as:

$$z_j(t) = s(t)q^*(t-t_j)$$

$$= \frac{1}{2}\left[\sum_i \sum_{n=-\infty}^{\infty} p_i(t)g(t)e(t_i,\phi)d(nT_c)q(nT_c)q^*(t-t_j)R(t-t_i-nT_c)\right] + n''(t) \quad \text{Eq (8)}$$

where $q^*(t-t_j)$ is a complex-conjugate despreading sequence used for the j-th finger and having an time offset, $t_j$, corresponding to the arrival time of the j–multipath to be processed by the j-th finger; and n"(t) is the despread complex baseband noise.

The despread signal, $z_j(t)$, for the j-th finger can be decomposed into two components. The first component corresponds the multipath of interest (i.e., $t_i=t_j$), which is being processed by the j-th finger. The second component corresponds to all other multipaths (i.e., $t_i \neq t_j$) included in the received signal, which constitute as interference (i.e., noise) to the j-th multipath of interest. The two components can be expressed as:

$$z_j(t) = \frac{1}{2}\sum_{n=-\infty}^{+\infty} p_j(t)g(t)e(t_j,\phi)d(nT_c)q(nT_c)q^*(t-t_j)R(t-t_j-nT_c) +$$

$$\frac{1}{2}\sum_{i \neq j}\sum_{n=-\infty}^{+\infty} p_i(t)g(t)e(t_i,\phi)d(nT_c)q(nT_c)q^*(t-t_j)R(t-t_i-nT_c) + n''(t) \quad \text{Eq (9a)}$$

$$= z_{data,j}(t) + z_{int,j}(t) + n''(t)$$

The first term of equation (9a) simplifies greatly if there is no inter-chip-interference (ICI) and the desired multipath (i=j) is sampled on its peaks, as follows:

$$z_{data,j}(t_j + mT_c) = p_j(t_j + mT_c)g(t_j + mT_c)e(t_j,\phi)d(mT_c)R(0) \quad \text{Eq (9b)}$$

where m is an integer, and the non-ICI assumption of $R(mT_c)=0$, for all $m \neq 0$ was applied.

The desired sampling peaks are those times when the argument to R() is zero. Hence, when t and $t_i$ are at integer PN chips difference in equation (9a).

The first component in the despread signal, $z_{data,j}(t)$, includes the transmitted data, despread at the multipath offset of interest. In the j-th finger used to process the j-th multipath, the timing of the finger ($t-t_j$) is aligned to the arrival time of the j-th multipath. Thus, the time offset of the despreading sequence $q^*(t-t_j)$ is aligned to that of the j-th multipath, and the effect of the spreading and despreading (i.e., $q(t-t_i)q^*(t-t_j)=2$, when i=j) can be eliminated from the first component for the j-th multipath after accumulation of $z_j(t)$ over a symbol period. (Symbol periods are coincident with complete Walsh functions.)

The second component in the despread signal, $z_{int,j}(t)$, includes the pilot and traffic data for the other multipaths (i.e., i≠j). Since the pilot is a known data pattern (e.g., typically a sequence of all zeros), the pilot in the other multipaths may be estimated and removed from the j-th multipath. The other-path pilot interference, $z_{pint,j}(t)$, on the j-th multipath can be expressed as:

$$z_{pint,j}(t) = \frac{1}{2} \sum_{i \neq j} \sum_{n=-\infty}^{+\infty} \sqrt{\frac{E_{c,pilot}}{R(0)}} \qquad \text{Eq (10)}$$

$$p_i(t)g(t)e(t_i, \phi)q(nT_c)q^*(t-t_j)R(t-t_i-nT_c)$$

The other-path pilot interference, $z_{pint,j}(t)$, on the j-th multipath may further be decomposed into two components, which can be expressed as:

$$z_{pint,j}(t) = \sum_{i \neq j} (z_{pint\_slow,i}(t) \cdot z_{pint\_fast,i,j}(t)), \text{ where} \qquad \text{Eq (11)}$$

$$z_{pint\_slow,i}(t) = \frac{1}{2}\sqrt{\frac{E_{c,pilot}}{R(0)}} \; p_i(t)g(t)e(t_i, \phi), \text{ and} \qquad \text{Eq (12)}$$

$$z_{pint\_fast,i,j}(t) = \sum_{n=-\infty}^{+\infty} q(nT_c)q^*(t-t_j)R(t-t_i-nT_c). \qquad \text{Eq (13)}$$

As shown above, the slow pilot interference component, $z_{pint\_slow,i}(t)$ from the i-th multipath on the j-th multipath includes (1) the processed channel gain for the i-th multipath (i.e., $p_i(t)g(t)$) and (2) the phase and fading process of the i-th multipath (i.e., $e(t_i,\phi)=e^{-jw_ct_i}e^{j\phi}$). This slow pilot interference component is representative of the gain and phase of the pilot for the i-th multipath after signal processing at the terminal, and may be estimated by filtering the pilot in the i-th multipath.

The fast pilot interference component, $z_{pint\_fast,i,j}(t)$, from the i-th multipath on the j-th multipath includes (1) a "cross-correlation" term between the spreading sequence in the i-th multipath and the despreading sequence for the j-th multipath (i.e., $q(t-t_i)q^*(t-t_j)$), (2) a $R(t-t_i-nT_c)$ term for the matched-filter response weighting, which relates to the relative delays of the i-th and j-th multipaths, and (3) a summation $$\sum_{n=-\infty}^{+\infty}$$

of these terms to capture the effects of several PN chips in the vicinity of the actual relative delay (i.e., the $R(t-t_i-nT_c)$ weighting continues for several PN chips in both directions, similar to a non-causal filter impulse response).

The summation effect in equation (13) may be explained as follows. Consider an eye diagram commonly used in digital communications. The on-time samples are purely a function of the value sent at that time, if the filtering is ideal. At any time between the peak on-time samples, the samples several before and several after the on-time samples contribute to the value at this time, due to the filtering effects which smear the time-domain samples.

Aspects of the present invention provide techniques to cancel pilot interference in a wireless communication system. A received signal typically includes a number of signal instances (i.e., multipaths). For each multipath to be processed (i.e., each desired multipath), the other multipaths are effectively interfering multipaths that act as interference to the desired multipath. If the pilot is generated based on a known data pattern (i.e., a sequence of all zeros) and covered with a particular channelization code (e.g., a Walsh code of zero), then the pilot in an interfering multipath may be estimated as simply the spreading sequence at a time offset corresponding to the arrival time of that multipath at the receiver. The pilot interference from each interference multipath may be estimated based on the spreading sequence for the interfering multipath and the despreading sequence for the desired multipath. The total pilot interference from a number of interfering multipaths may be subtracted from the data component (or data signal) in the desired multipath to provide pilot-canceled data having improved performance.

In a typical receiver implementation, the conditioned signal, $s(t)$, is sampled with a single sampling clock at multiple times (e.g., 2×, 4×, 8×, 16×, and so on) the chip rate of the forward link modulated signal, $x(t)$. The stream of samples, $s(k)$, would include all multipaths in the received signal, $y(t)$, and is provided to each assigned finger in the rake receiver. A number of fingers may be assigned to independently process the same sample stream, $s(k)$, to recover a number of multipaths. Each finger has its timing aligned to the arrival time of the assigned multipath.

A PN generator may be designed to receive the sampling clock and a set of time offsets ($t_j$, where j=1, 2, . . . ) and generate a set of despreading sequences at the proper time offsets for the assigned fingers (e.g., $q^*(t-t_1)$, $q^*(t-t_2)$, and so on). Each despreading sequence is then provided to a respective finger and used to despread the sample stream, $s(k)$, as described below.

To derive the cross-correlation term between the spreading and despreading sequences (i.e., $q(t-t_i)q^*(t-t_j)$), the despreading sequence generated for the i-th multipath may be conjugated (to obtain $q(t-t_i)$) and multiplied with the complex-conjugated despreading sequence generated for the j-th multipath, $q^*(t-t_j)$.

As shown in equations (11) through (13), the j-th multipath may include pilot interference from a number of other multipaths (i.e., all i, where i≠j). Any number of these other-path pilot interference terms may be estimated and canceled from the j-th multipath. The following describes several specific implementations of the pilot interference cancellation techniques.

FIG. 1 is a diagram of a wireless communication system 100 that supports a number of users and is capable of implementing various aspects and embodiments of the invention. System 100 provides communication for a number of cells, with each cell being serviced by a corresponding base station 104. The base stations are also commonly referred to as basestation transceiver systems (BTS) and access points. Various terminals 106 are dispersed throughout the system (only one is shown in FIG. 1 for simplicity).

Each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station. A signal transmitted from a base station may reach the terminal via one or multiple signal paths. These signal paths may include a straight path (such as signal path 110c) and/or reflected paths (such as signal paths 110a and 110b). Reflected paths 110a and 110b are created when the transmitted signal is reflected off reflection sources 108a and 108b, respectively, and arrives at the terminal via different paths than the line-of-sight path. Reflection sources 108 are typically artifacts in the environment in which the terminal is operating (e.g., buildings, trees, or some other structures). The received signal at the terminal may thus comprise a number of signal instances (or multipaths) from one or more base stations.

In system 100, a system controller 102 (which is also often referred to as a base station controller (BSC)) couples to base stations 104 and may further couple to a public switched telephone network (PSTN) via a mobile switching center (MSC), which is not shown in FIG. 1 for simplicity. The system controller may also couple into a packet network via a packet data serving node (PDSN), which is also not shown in FIG. 1. System controller 102 provides coordination and control for the base stations coupled to it. System controller 102 further controls the routing of telephone calls among terminals 106, and between terminals 106 and other users coupled to the PSTN (e.g., conventional telephones) and to the packet network, via base stations 104.

System 100 may be designed to support one or more CDMA standards such as IS-95, IS-856, cdma2000, W-CDMA, some other CDMA standard, or a combination thereof. These CDMA standards are known in the art and incorporated herein by reference.

Various aspects and embodiments of the invention may be used to both the forward and reverse links in a wireless communication system. For clarity, the pilot interference cancellation techniques are now specifically described for the forward link in an IS-95 CDMA system.

Figure 2:
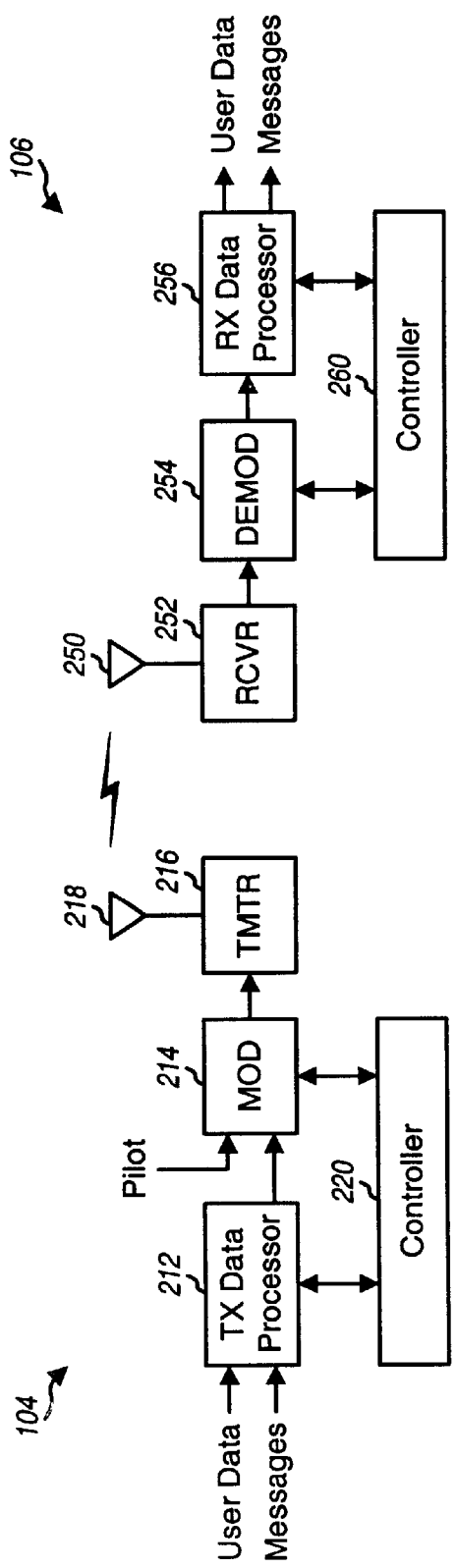
FIG. 2 is a simplified block diagram of an embodiment of a base station and a terminal.

FIG. 2 is a simplified block diagram of an embodiment of base station 104 and terminal 106. On the forward link, at base station 104, a transmit (TX) data processor 212 receives various types of "traffic" such as user-specific data, messages, and so on. TX data processor 212 then formats and codes the different types of traffic based on one or more coding schemes to provide coded data. Each coding scheme may include any combination of cyclic redundancy check (CRC), convolutional, Turbo, block, and other coding, or no coding at all. Interleaving is commonly applied when error correcting codes are used to combat fading. Other coding scheme may include automatic repeat request (ARQ), hybrid ARQ, and incremental redundancy repeat. Typically, different types of traffic are coded using different coding schemes.

A modulator (MOD) 214 then receives pilot data and the coded data from TX data processor 212, and further processes the received data to generate modulated data. For the IS-95 CDMA system, the processing by modulator 214 includes (1) channelizing (i.e., covering) the data for each of a number of code channels (e.g., traffic, sync, paging, and pilot channels) with a respective Walsh code to channelize the user-specific data, messages, and pilot data onto their respective code channels, (2) summing the channelized data for all code channels, and (3) spreading the summed or aggregate data with a complex pseudo-noise (PN) sequence (IPN+jQPN) at a particular offset assigned to the base station. "Covering" with a Walsh code in IS-95 and cdma2000 is equivalent to "spreading" with an orthogonal variable spreading factor (OVSF) code in W-CDMA, and "spreading" with the PN sequence in IS-95 and cdma2000 is equivalent to "scrambling" with a scrambling sequence in W-CDMA. In place of a Walsh code, a quasi-orthogonal function (QOF) may sometimes be used, as supported by the cdma2000 standard. The Walsh code, QOF, and OVSF code are three different types of channelization code that may be used to channelize data onto different code channels.

The modulated data is then provided to a transmitter (TMTR) 216 and conditioned. The signal conditioning includes (1) filtering each of the inphase and quadrature spread data with a respective transmit filter, (2) upconverting the filtered inphase and quadrature spread data with $\cos(w_c t)$ and $\sin(w_c t)$, respectively, to generate an inphase and a quadrature component, respectively, and (3) summing the inphase and quadrature components to generate a forward link modulated signal, which can be expressed as shown in equation (1). The forward link modulated signal is then transmitted via an antenna 218 and over a wireless communication channel to the terminals.

At terminal 106, the forward link modulated signal is received by an antenna 250 and provided to a receiver (RCVR) unit 252. Receiver unit 252 conditions (e.g., filters, amplifies, downconverts, and digitizes) the received signal and provides data samples. A demodulator (DEMOD) 254 then receives and processes the data samples to provide recovered symbols. For some CDMA systems, the processing by demodulator 254 includes (1) despreading the data samples with the same complex PN sequence used to spread the data at the base station, (2) decovering the despread samples to channelize the received data and pilot onto their respective code channels, and (3) coherently demodulating the channelized data with a pilot recovered from the received signal. Demodulator 254 may implement a rake receiver that can process multiple signal instances (or multipaths) in the received signal, as described below.

A receive (RX) data processor 256 then receives and decodes the symbols from demodulator 254 to recover the user-specific data and messages transmitted on the forward link. The processing by demodulator 254 and RX data processor 256 is complementary to that performed by modulator 214 and TX data processor 212, respectively, at base station 104.

Figure 3:
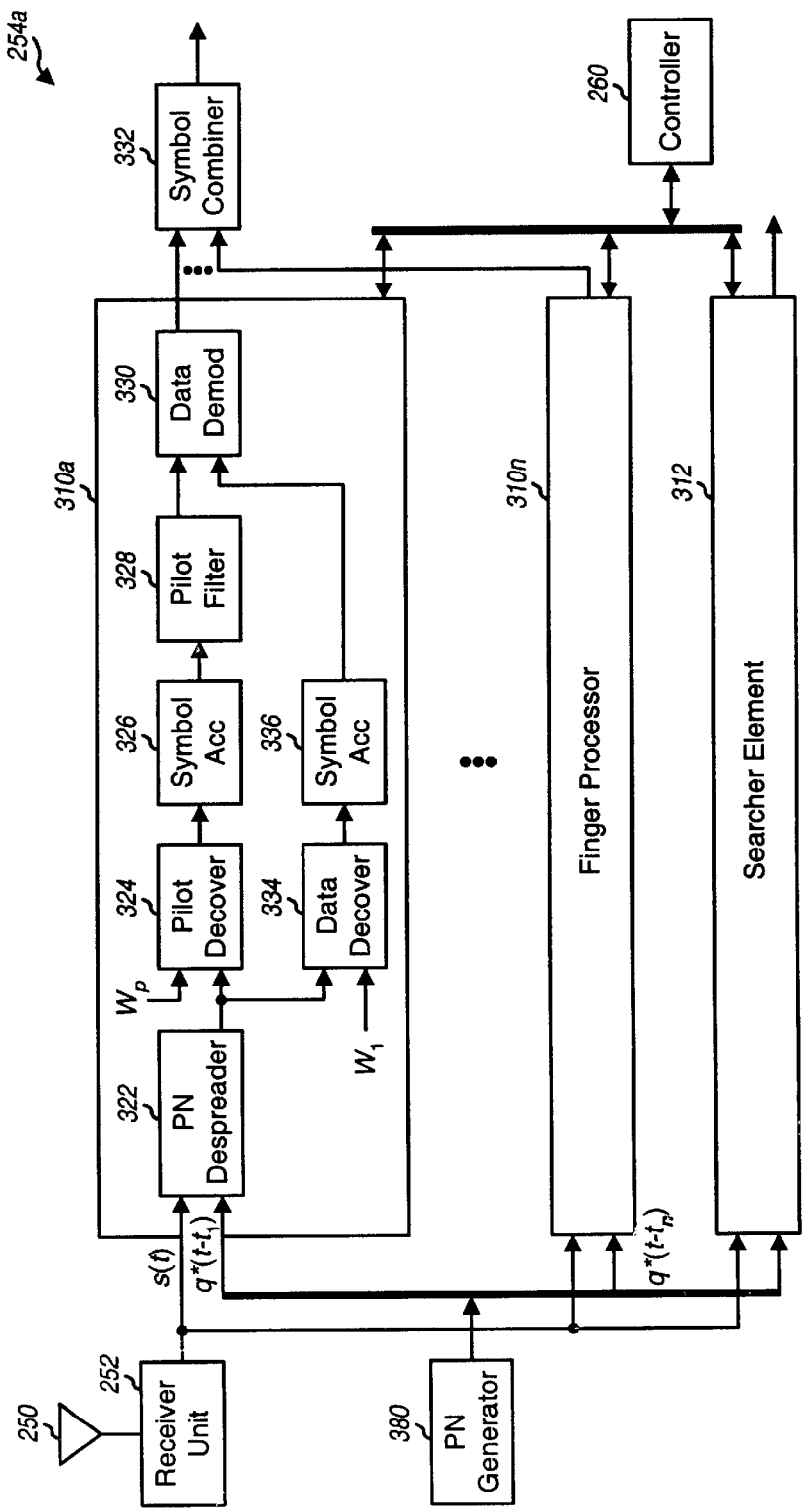
FIG. 3 is a block diagram of a rake receiver capable of receiving and demodulating a forward link modulated signal transmitted from the base station.

FIG. 3 is a block diagram of a rake receiver 254a within terminal 106, which is capable of receiving and demodulating a forward link modulated signal transmitted from base station 104. Due to the multipath environment, the forward link modulated signal transmitted from base station 104 may arrive at terminal 106 via a number of signal paths (as shown in FIG. 1), and the received signal typically comprises a combination of many different instances of the forward link modulated signal. Each signal instance (or multipath) is typically associated with a particular magnitude, phase, and arrival time (or time offset). If the difference between the arrival times is more than one PN chip duration at the terminal, then the signal at the input to receiver unit 252 can be expressed as shown in equation (4).

Receiver unit 252 amplifies and downconverts the received signal and further filters the signal with a received filter that is typically matched to the transmit filter used at the base station. The conditioned signal, s(t), after downconversion and matched filtering, can be expressed as shown in equation (5). Receiver unit 252 then digitizes the signal s(t) to generate a stream of samples s(k).

The digitalization may be achieved in various manners, depending on the particular design of terminal 106. In one implementation, the signal s(t) is sampled with a single analog-to-digital converter (ADC) at multiple times the chip rate (e.g., 2×, 4×, 8×, or 16×times the chip rate, or possibly higher) based on a single sampling clock. This sampling clock may or may not be locked to the chip timing of the received signal. In another implementation, the signal s(t) is sampled with a number of ADCs, with each ADC sampling the signal s(t) at the peak sampling time of a respective multipath. In yet another implementation, it is also possible to highly oversample the received signal with a delta-sigma ADC at a rate that is not a multiple of the chip rate, and to reconstruct the received samples at the desired chip rate multiple through decimation, filtering, and rate conversion. In still yet another implementation, it is also possible to sample at a particular rate (e.g., 1.333), and to reconstruct the desired samples through interpolation filtering. For all implementations, the only requirement is that the received signal be sampled at greater than the chip rate, and samples at the required time resolution are provided to the PN despreader. For simplicity, the description below assumes that the signal s(t) is sampled with a single ADC, unless otherwise noted.

Figure 4:
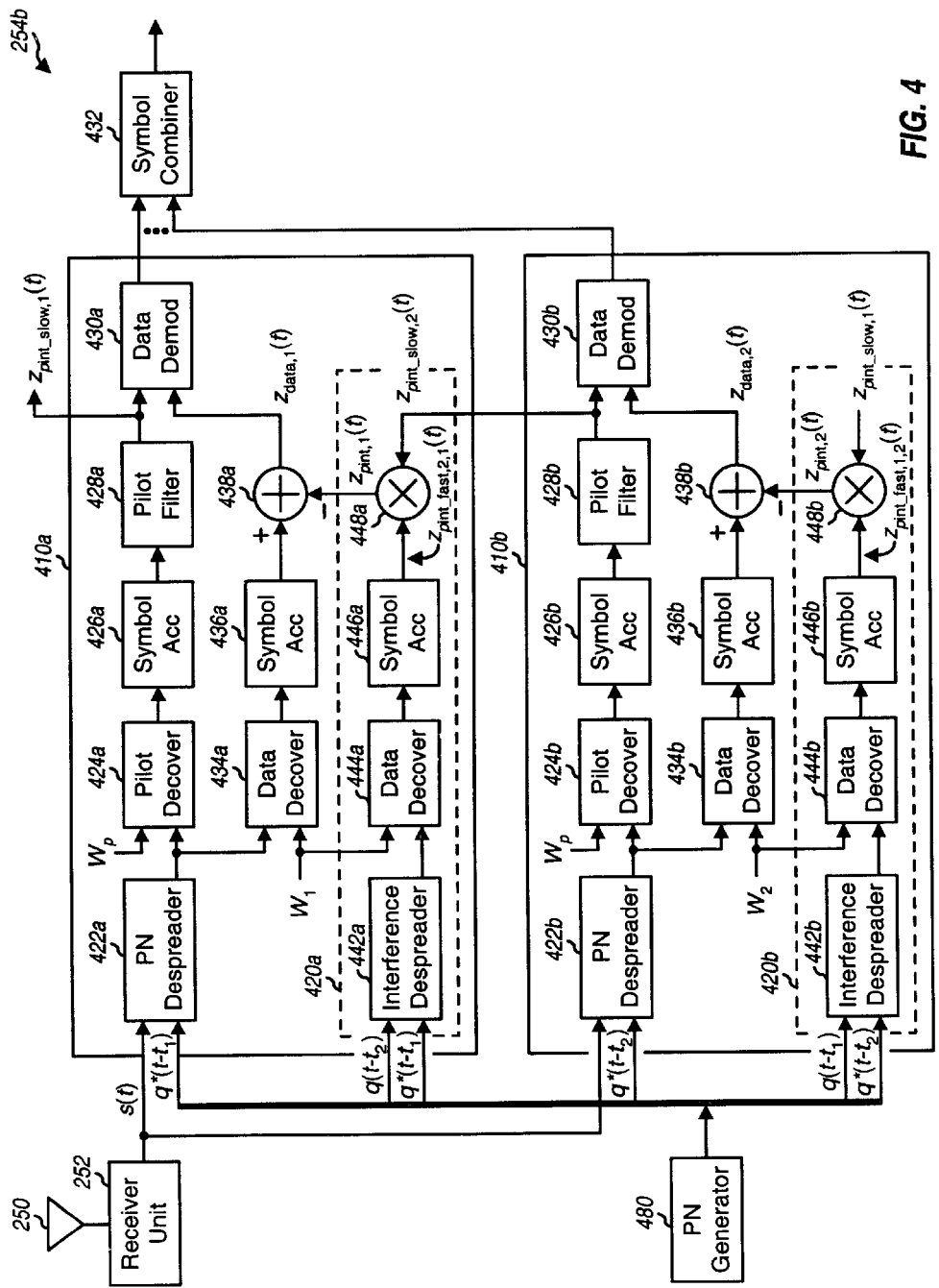
FIG. 4 is a block diagram of a rake receiver capable of estimating and canceling pilot interference, in accordance with an embodiment of the invention.

The data samples (which is also denoted as s(t) in FIG. 4) are then provided to a number of finger processors 310 of rake receiver 254a. As noted above, due to multipath and other phenomena, a signal transmitted from each base station may be received by the terminal via multiple signal paths. The received signal at the terminal may then include a number of multipaths from one or more base stations. A searcher 312 is used to search for strong multipaths in the received signal and to provide an indication of the strength and timing of each found multipath that meets a set of criteria. Each finger processor 310 of the rake receiver may then be assigned to process a respective multipath of interest (e.g., a multipath of sufficient strength, as determined by controller 260 based on the signal strength information provided by searcher 312).

Within each assigned finger processor 310, the data samples are first decimated to the chip rate from a higher sampling rate, such as 8×chip rate. The decimation occurs at the proper "fine-grain" timing phase as directed by the finger processor's timing recovery (i.e., "time tracking") function. The time tracker is not shown in FIG. 3 for simplicity, but is known in the art and may be implemented as a delay locked loop or taudither loop. The samples at the chip rate are then provided to a PN despreader 322, which also receives a (complex-conjugate) PN sequence, $q^*(t-t_j)$, having a time offset, $t_j$, corresponding to the arrival time of the j-th multipath to be processed by the finger processor. PN despreader 322 despreads the data samples with the received PN sequence and provides despread samples. As shown in equations (9a) and (10), the despread samples $z_j(t)$ from PN despreader 322 of each finger processor 310 include a component, $z_{pint,j}(t)$, that represents the interference due to the pilots in the other multipaths not being processed by the finger processor (i.e., the interfering multipaths).

To recover the pilot, a pilot decoverer 324 first multiplies the despread samples with the same Walsh code, $W_p$, used to cover the pilot data at the base station (e.g., a Walsh code of zero for IS-95 and cdma2000). The decovered pilot samples are then accumulated by an accumulator 326 over a particular accumulation time interval to provide pilot symbols. The accumulation time interval is typically an integer multiple (i.e., $N_a$=1, 2, and so on) of the Walsh symbol length (which is 64 chips for IS-95). Since the pilot data is covered with the Walsh code of zero (i.e., a sequence of 64 zeros) and the data on other code channels are covered with other Walsh codes, the accumulation over $64 \cdot N_a$ chips effectively removes the data on the other code channels and only the pilot data is extracted, if orthogonality between the code channels is maintained after transmission through the communication link. The processing performed by pilot decoverer 324 and accumulator 326 is often collectively referred to as "decovering", and these two elements are often collectively referred to as a "decover".

The pilot symbols from accumulator 326 represent the recovered pilot signal for the j-th multipath being processed by the finger processor. The pilot symbols are then provided to a pilot filter 328 and filtered based on a particular lowpass filter response to remove noise. Pilot filter 328 may be implemented as a finite impulse response filter (FIR), an infinite impulse response (IIR) filter, or some other filter structure. Pilot filter 328 then provides pilot estimates to a data demodulator 330.

Similarly, to recover the data on a particular code channel, the despread samples from PN despreader 322 are first multiplied by a data decoverer 334 with the same Walsh code, $W_j$, assigned to the code channel being recovered by the finger processor. The decovered data samples are then accumulated by an accumulator 336 over the Walsh symbol length (which is 64 chips for IS-95) to provide data symbols. Again, since the data on each code channel is covered with a different Walsh code, decovering with the Walsh code effectively extracts the data on the desired code channel and removes the data on the other code channels, if orthogonality is maintained between these code channels. The data symbols from accumulator 336 represent the data for the j-th multipath being processed by the finger processor.

A data demodulator 330 receives and demodulates the data symbols with the pilot estimates to generate demodulated symbols (i.e., demodulated data), which are then provided to a symbol combiner 332. Symbol combiner 332 receives and coherently combines the demodulated symbols from all finger processors 310 assigned to process the receive signal, and provides recovered symbols to RX data processor 256 for further processing. The data demodulation and symbol combining may be achieved as described in U.S. Pat. No. 5,764,687 patent, which is incorporated herein by reference. The '687 patent describes BPSK data demodulation for IS-95 by performing dot product between the despread data and the filtered pilot. The demodulation of QPSK modulation, which is used in cdma2000 and W-CDMA, is a straight-forward extension of the techniques described in the '687 patent. That is, instead of dot product, both dot product and cross-product are used to recover the inphase and quadrature streams.

FIG. 4 is a block diagram of a rake receiver 254b capable of estimating and canceling pilot interference, in accordance with an embodiment of the invention. Rake receiver 254b in FIG. 4 is similar to rake receiver 254a in FIG. 3, but further includes a pilot interference estimator 440 in each finger processor that attempts to estimate and cancel the pilot interference, $z_{pint,j}(t)$, described in equation (11). In the embodiment shown in FIG. 4, pilot interference estimator 440 includes an interference despreader 442, a data decoverer 444, a symbol accumulator 446, and a multiplier 448. For clarity, the pilot cancellation is initially described for a case whereby two multipaths are processed by two finger processors of the rake receiver. Pilot cancellation for a greater number of multipaths is described below.

As shown in equations (10) through (13), the pilot interference may be decomposed into two components—a slow pilot interference component and a fast pilot interference component. The (relatively) slow pilot interference component, $z_{pint,slow,i}(t)$, is simply the gain and phase of the pilot received in the i-th interfering multipath, and can be expressed as shown in equation (12). The (relatively) fast pilot interference component, $z_{pint,fast,i,j}(t)$, can be expressed as shown in equation (13), and results from despreading the pilot in the i-th interfering multipath (i.e., the PN sequence with the time offset corresponding to the arrival time of the i-th multipath) with the PN sequence for the j-th desired multipath (i.e., the PN sequence aligned in time with the j-th multipath). To generate this fast pilot interference component, the PN sequence for the i-th interfering multipath (which is denoted as $q(t-t_2)$ for finger processor 410a in FIG. 4) can be despread (i.e., multiplied) with the PN sequence for the j-th desired multipath (which is denoted as $q^*(t-t_1)$ for finger processor 410a). The result from this despread operation can be used to estimate the interference due to the pilot in the i-th multipath on the j-th multipath.

For the two-multipath rake receiver configuration shown in FIG. 4, to generate the fast pilot interference component, interference despreader 442 within each finger processor 410 receives and despreads the (complex) PN sequence, $q(t-t_i)$, for the interfering multipath with the (complex-conjugate) PN sequence for the desired multipath, $q^*(t-t_j)$. The output from despreader 442 represents the cross-correlation between the interfering PN sequence (i.e., the interfering pilot) and the PN sequence for the desired multipath. This cross-correlation of the PN sequences corresponds to the fast pilot interference component, $z_{pint,fast,i,j}(t)$, shown in equation (13).

The samples from interference despreader 442 are then provided to data decoverer 444 and multiplied with the Walsh code, $W_j$, assigned to the code channel being recovered by the finger processor. The decovered samples from data decoverer 444 are then provided to accumulator 446 and accumulated over the Walsh code length (e.g., 64 chips for IS-95) to provide despread pilot symbols. The Walsh decovering removes the pilot interference from the code channel of interest.

The slow pilot interference component, $z_{pint,slow,i}(t)$, for the j-th desired multipath includes the processing gain for the i-th interfering multipath and the phase and fading process of the i-th multipath. This slow pilot interference component may be estimated by the pilot filter in the finger processor assigned to process the i-th interfering multipath, as shown in FIG. 4.

In each finger processor, the fast pilot interference component, $z_{pint,fast,i,j}(t)$, provided by accumulator 446 within same finger processor and the slow pilot interference component, $z_{pint,slow,i}(t)$, provided by pilot filter 428 in the other finger processor are both provided to multiplier 448. Multiplier 448 then performs a complex multiply of the fast and slow pilot interference components to generate the pilot interference, $z_{pint,j}(t)$, on the j-th desired multipath. An adder 438 receives the pilot interference, $z_{pint,j}(t)$, from multiplier 448 and the decovered symbols from accumulator 446, subtracts the pilot interference from the decovered symbols, and provides pilot-canceled data symbols, $z_{data,j}(t)$, having the pilot interference from the other multipath approximately removed. The pilot-canceled data symbols are then provided to data demodulator 430 within the same finger processor. Data demodulator 430 then coherently demodulates the pilot-canceled data symbols with the pilot estimates from pilot filter 428 to provide the demodulated symbols (i.e., demodulated data).

Figure 5A:
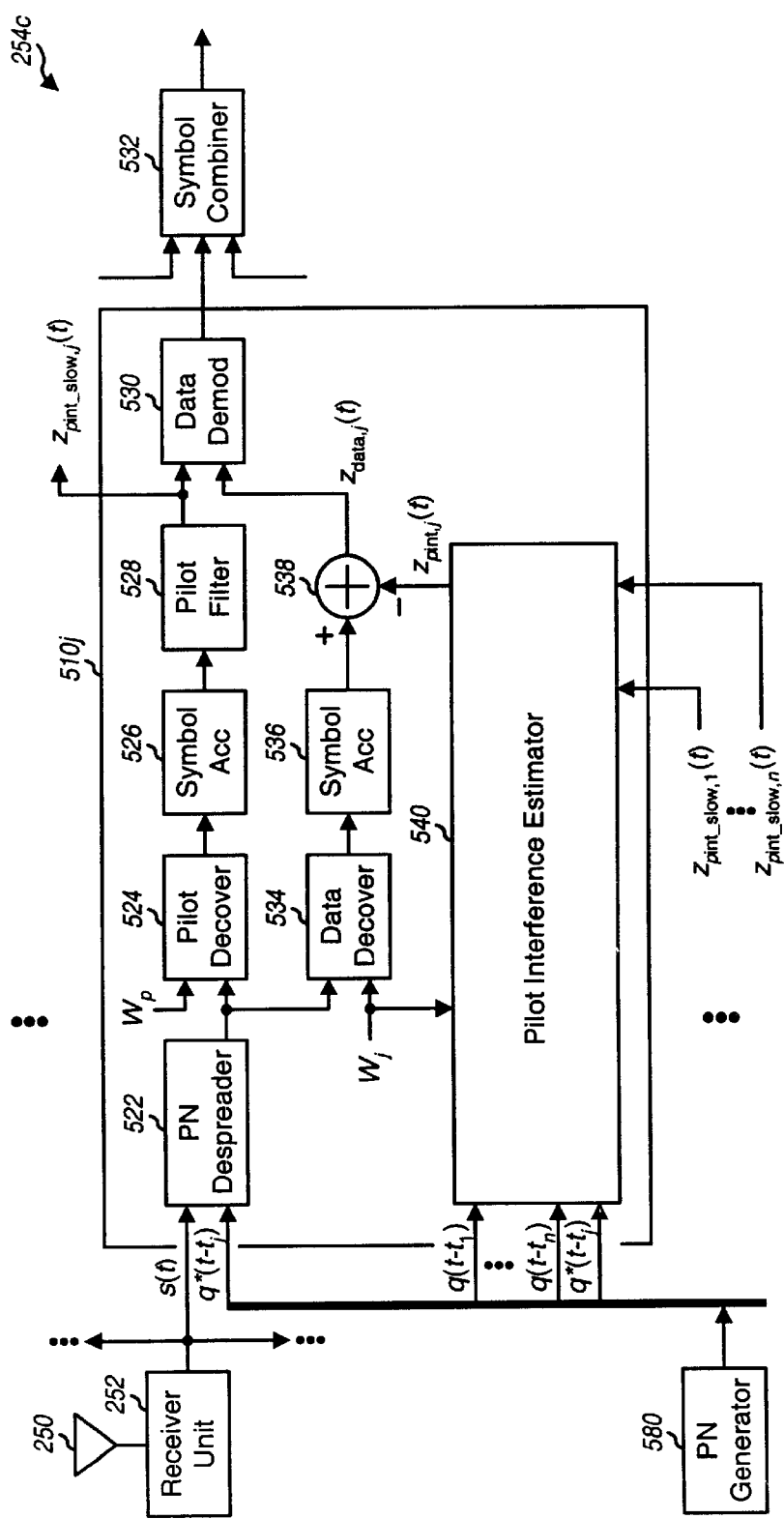
FIG. 5A is a block diagram of another embodiment of a rake receiver capable of canceling pilot interference.

FIG. 5A is a block diagram of another embodiment of a rake receiver 254c capable of canceling pilot interference. Rake receiver 254c in FIG. 5A is similar to rake receiver 254b in FIG. 4, and includes a number of finger processors 510 (only one finger processor is shown in FIG. 5A for simplicity). Each finger processor 510 includes a pilot interference estimator 540 that is capable of estimating the pilot interference from multiple interfering multipaths on the j-th desired multipath.

Figure 5B:
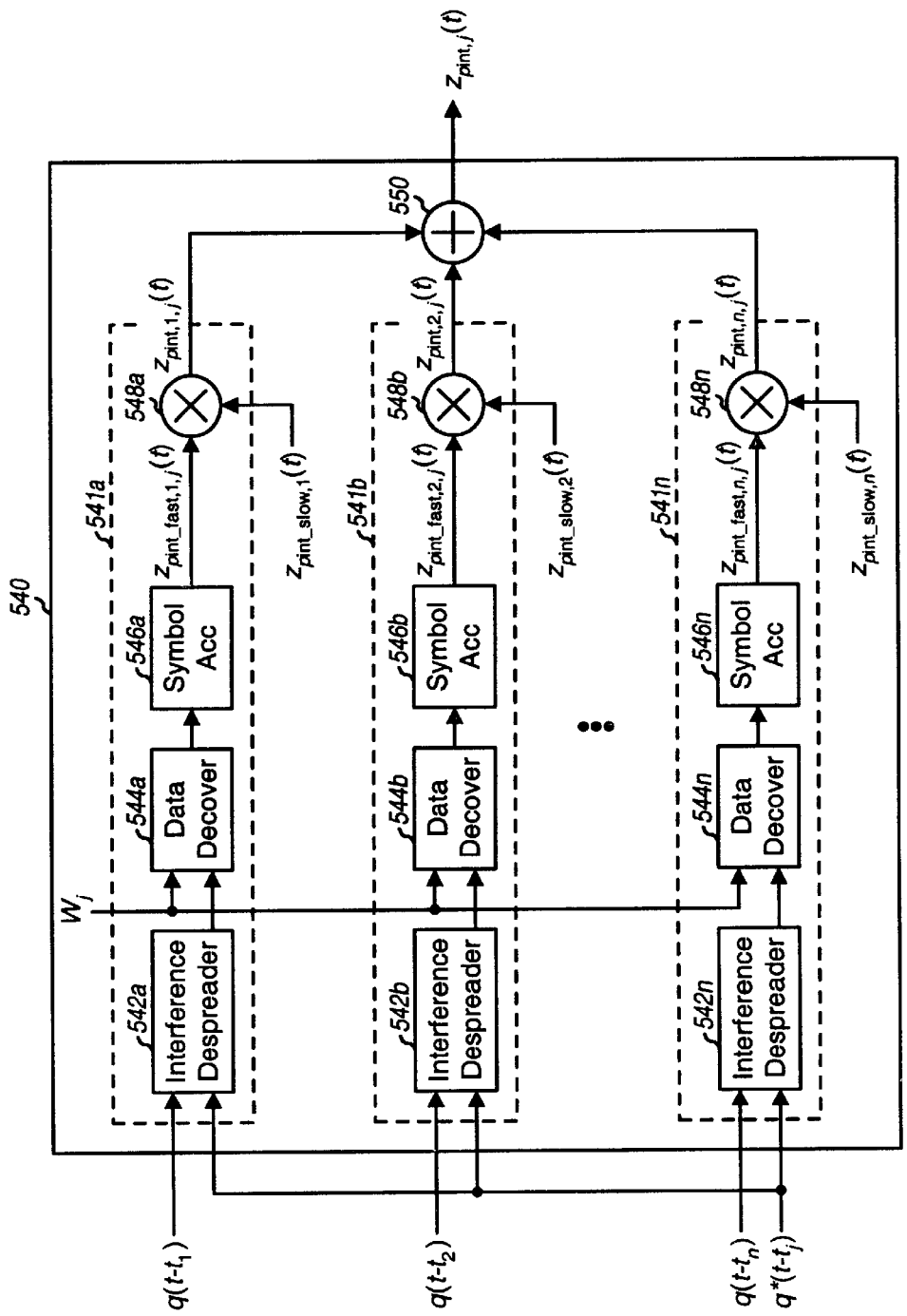
FIG. 5B is a block diagram of specific embodiment of a pilot interference estimator.

FIG. 5B is a block diagram of a specific embodiment of pilot interference estimator 540. As shown in equation (11), the total pilot interference, $z_{pint,j}(t)$, on the j-th desired multipath is composed of the pilot interference from all other interfering multipaths (i.e., for all i, where i≠j). Pilot interference estimator 540 includes a number of single-multipath pilot interference estimators 541, with each estimator 541 being assignable to estimate the pilot interference from a respective interfering multipath on the j-th desired multipath.

Within each assigned estimator 541, the fast pilot interference component, $z_{pint,fast,i,j}(t)$, from the i-th interfering multipath on the j-th desired multipath may be estimated by first despreading the PN sequence, $q(t-t_i)$, for the i-th interfering multipath with the PN sequence, $q^*(t-t_j)$, for the j-th desired multipath. The PN sequence for the i-th multipath, $q(t-t_i)$, has a time offset, $t_i$, corresponding to the arrival time of the i-th multipath, and the PN sequence for the j-th multipath, $q^*(t-t_j)$, has a time offset, $t_j$, corresponding to the arrival time of the j-th multipath. This despreading is performed by interference despreader 542. The output from despreader 542 represents the cross-correlation between the interfering PN sequence (i.e., the interfering pilot) for the i-th interfering multipath and the PN sequence for the j-th desired multipath. This cross-correlation of the PN sequences corresponds to the fast pilot interference component, $z_{pint,fast,i,j}(t)$.

The samples from interference despreader 542 are then provided to a data decoverer 544 and multiplied with the Walsh code, $W_j$, assigned to the code channel being recovered from the desired multipath by the finger processor. The decovered samples from data decoverer 544 are then provided to an accumulator 546 and accumulated over the Walsh symbol length (e.g., 64·N chips for IS-95). The Walsh decovering removes the pilot interference from the code channel of interest.

Each assigned estimator 541 further receives the slow pilot interference component, $z_{pint,slow,i}(t)$, from the finger processor assigned to process the i-th multipath. A multiplier 548 within estimator 541 then performs a complex multiply of the fast pilot interference component, $z_{pint,fast,i,j}(t)$, with the slow pilot interference component, $z_{pint,slow,i}(t)$, to generate the pilot interference, $z_{pint,i,j}(t) = z_{pint\_slow,i}(t) \cdot z_{pint\_fast,i,j}$ i-th interfering multipath on the j-th desired multipath.

A summer 550 then receives and sums the pilot interference from all assigned estimators 541, to derive the total pilot interference, $z_{pint,j}(t)$, on the j-th desired multipath, as shown in equation (11). This total pilot interference is provided as the output from pilot interference estimator 540.

Referring back to FIG. 5A, an adder 538 within each assigned finger processor 510 receives the total pilot interference, $z_{pint,j}(t)$, from pilot interference estimator 540 and the decovered symbols from accumulator 536, subtracts the total pilot interference from the decovered symbols, and provides pilot-canceled data symbols, $z_{data,j}(t)$, having the pilot interference from the interfering multipaths approximately removed. The pilot-canceled data symbols, $z_{data,j}(t)$, are then provided to data demodulator 530 within the same finger processor and coherently demodulated with the pilot estimates from pilot filter 528 to provide demodulated symbols.

Figure 5C:
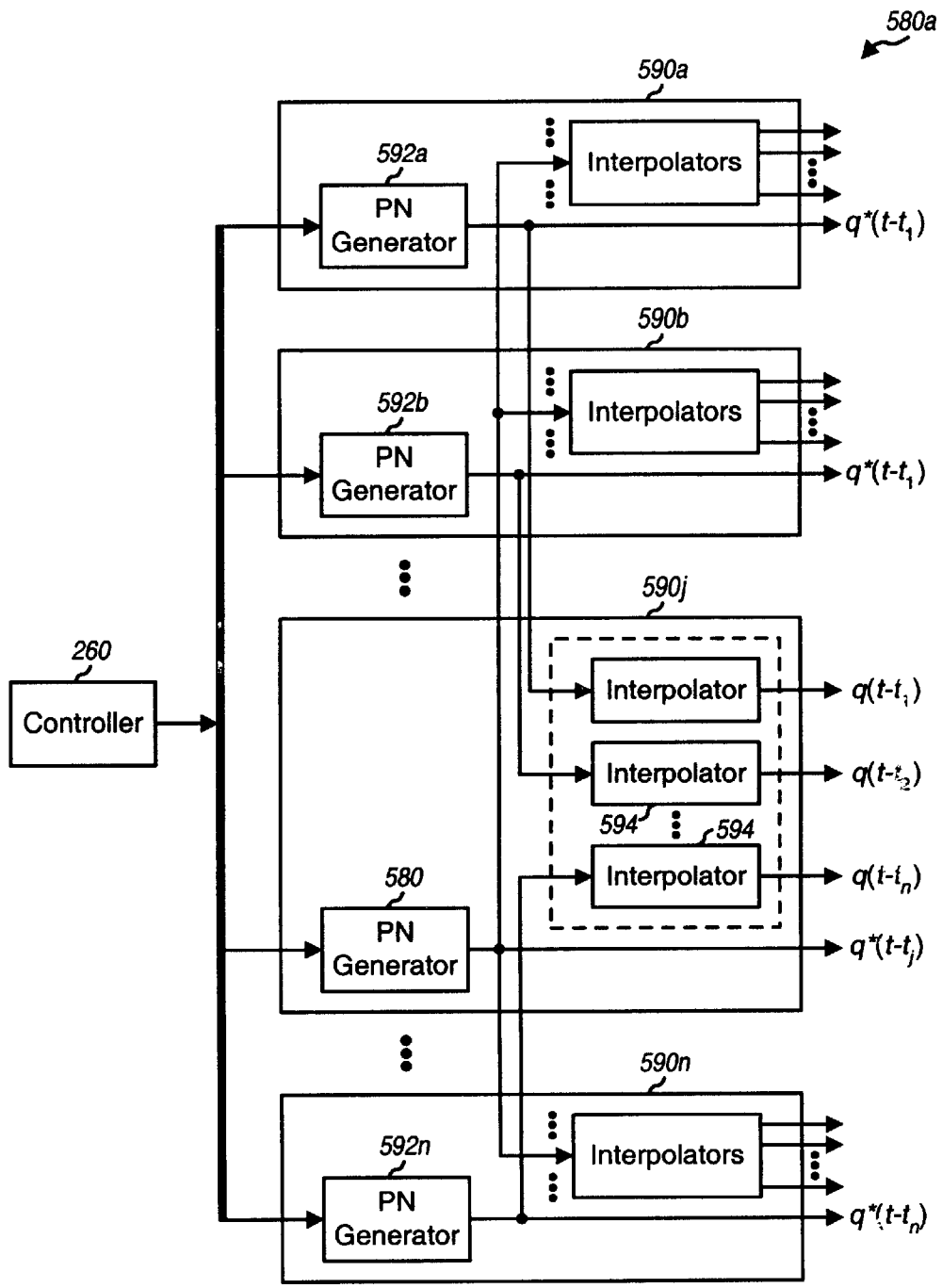
FIG. 5C is a block diagram of an embodiment of a PN generator capable of generating PN sequences for a number of multipaths of interest.

FIG. 5C is a block diagram of an embodiment of a PN generator 580a, which may be used to generate PN sequences for a number of multipaths of interest. PN generator 580a may be used for PN generators 380, 480, and 580 in FIGS. 3, 4, and 5A, respectively. PN generator 580a may be used in a rake receiver design whereby the data samples for each finger processor are generated by sampling the conditioned signal, s(t), with a respective sampling clock aligned to the peak of the multipath to be processed by the finger processor. In this design, the assigned finger processors may be associated with different sampling clocks and consequently different sample timing.

In the embodiment shown in FIG. 5C, PN generator 580a includes a number of PN generator units 590, one unit for each finger processor within the rake receiver. Each PN generator unit 590 is thus associated with a respective finger processor that may be assigned to process a respective multipath. Each PN generator unit 590 receives from controller 260 the time offset, $t_j$, for the desired multipath and generates the (complex-conjugate) PN sequence, $q^*(t-t_j)$, having the proper time offset, $t_j$, and based on the j-th sampling clock used to generate the samples for the associated finger processor. Each PN generator unit 590 further includes a set of interpolators 594 used to generate the PN sequences for the interfering multipaths based on the j-th sampling clock of the desired multipath. (For each finger processor, the desired multipaths for the other finger processors are the interfering multipaths for this finger processor.) Each interpolator 594 receives a PN sequence for an interfering multipath generated by another PN generator 592 based on the sampling clock for that interfering multipath, and interpolates the received PN sequence to generate another PN sequence, $q(t-t_i)$, having the same time offset but based on the sampling clock for the desired multipath. The interpolated PN sequence represents the PN sequence generated for the i-th interfering multipath but resampled using the sample timing of the j-th desired multipath. This allows for subsequent multiplication of the two PN sequences with different time offsets (i.e., $t_i$ and $t_j$) but having the same sample timing.

Each PN generator unit 590 thus generates the (complex-conjugate) PN sequence, $q^*(t-t_j)$, for the j-th desired multipath and the (complex) PN sequence, $q(t-t_i)$, for each interfering multipath, all based on the j-th sampling clock for the desired multipath. These PN sequences are then provided to the associated finger processor, as shown in FIGS. 4 and 5A.

In another receiver design, the received signal is sampled with a single sampling clock and the same stream of data samples are provided to all assigned finger processors. Each finger processor would then receive the PN sequences for the desired and interfering multipaths, all with the proper time offsets and based on the common sampling clock. For this receiver design, PN generator units 590 would include one PN generator unit 590 for each finger processor, with each PN generator unit 590 generating a PN sequence with the time offset corresponding to the arrival time for a respective desired multipath. Each finger processor would then receive the PN sequence, $q^*(t-t_j)$, for the desired multipath generated by the associated PN generator unit 590 and the PN sequences, $q(t-t_i)$, for the interfering multipaths generated by the other PN generator units. Since a common sampling clock is used for all finger processors, interpolators 594 would not be needed to interpolate PN sequences from one sampling clock to another sampling clock.

Figure 6A:
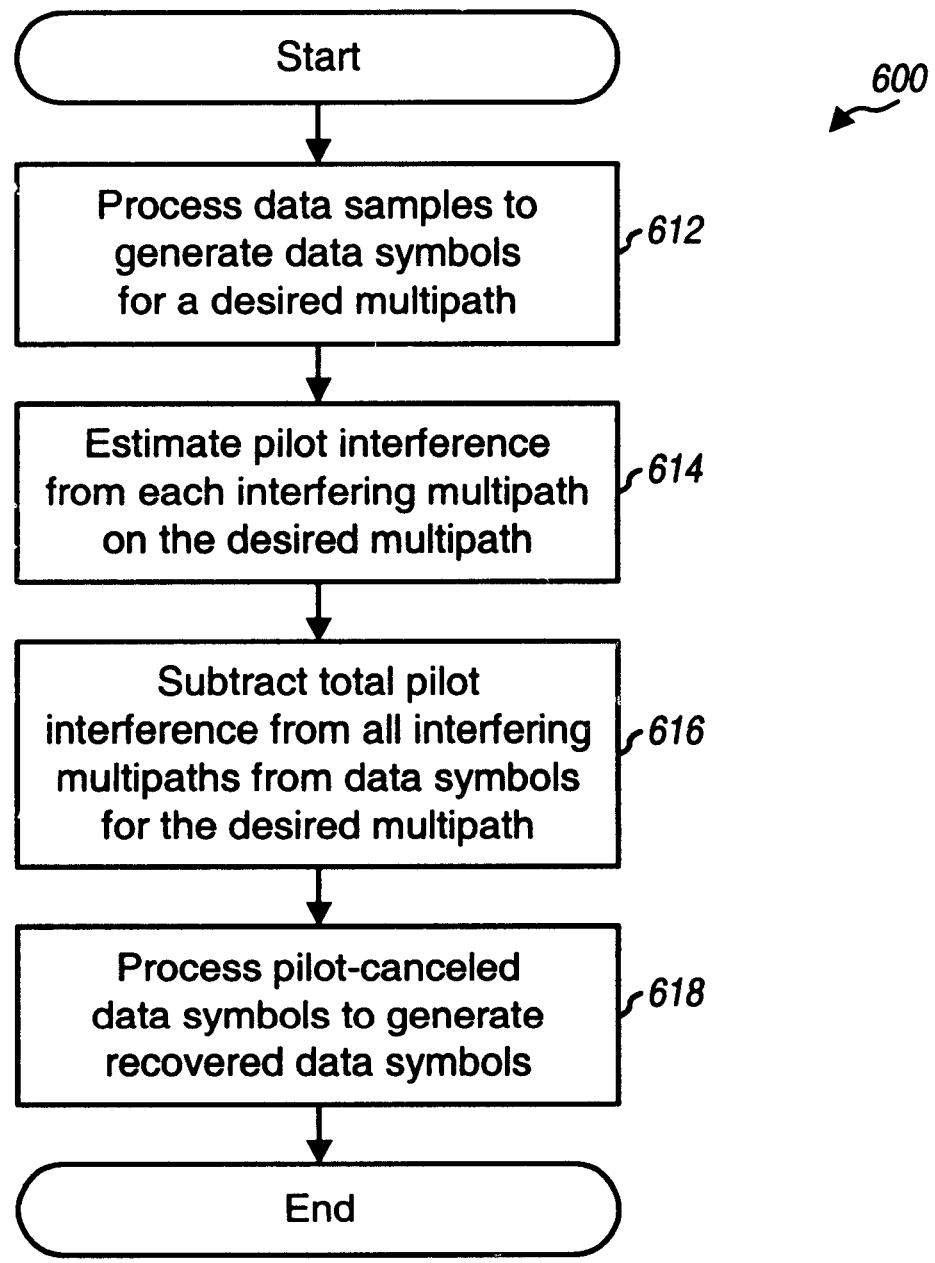
FIG. 6A is a flow diagram of a process to estimate and cancel pilot interference, in accordance with an embodiment of the invention.

FIG. 6A is a flow diagram of an overall process 600 to estimate and cancel pilot interference, in accordance with an embodiment of the invention. Process 600 may be implemented by the rake receivers shown in FIGS. 4 and 5A. Initially, the conditioned signal, s(t), is processed and digitized to generate data samples. In one embodiment, the signal s(t) is sampled with a single sampling clock. In another embodiment, the received signal is sampled with multiple sampling clocks aligned to the peaks of the multipaths to be processed.

FIG. 6A shows the processing performed for each desired multipath. First, the data samples are processed to generate data symbols for the desired multipath, at step 612. This may entail despreading the data samples with the PN sequence, $q^*(t-t_j)$, for the desired multipath, and further decovering the despread samples with the Walsh code, $W_j$, for the code channel to be recovered on the desired multipath, as shown in FIGS. 4 and 5A.

The pilot interference from each interfering multipath on the desired multipath is then estimated, at step 614. The pilot interference may be estimated as described above and also in FIG. 6B below. The pilot interference from all interfering multipaths is then combined, and the total pilot interference, $z_{pint,j}(t)$, is subtracted from the data symbols to generate pilot-canceled data symbols, $z_{data,j}(t)$, having the pilot interference from the interfering multipaths approximately removed, at step 616. The pilot-canceled data symbols, $z_{data,j}(t)$, are then further processed (e.g., demodulated with the pilot) to provide demodulated symbols, and the demodulated symbols from all assigned finger processors may be combined to generate recovered symbols, at step 618.

Figure 6B:
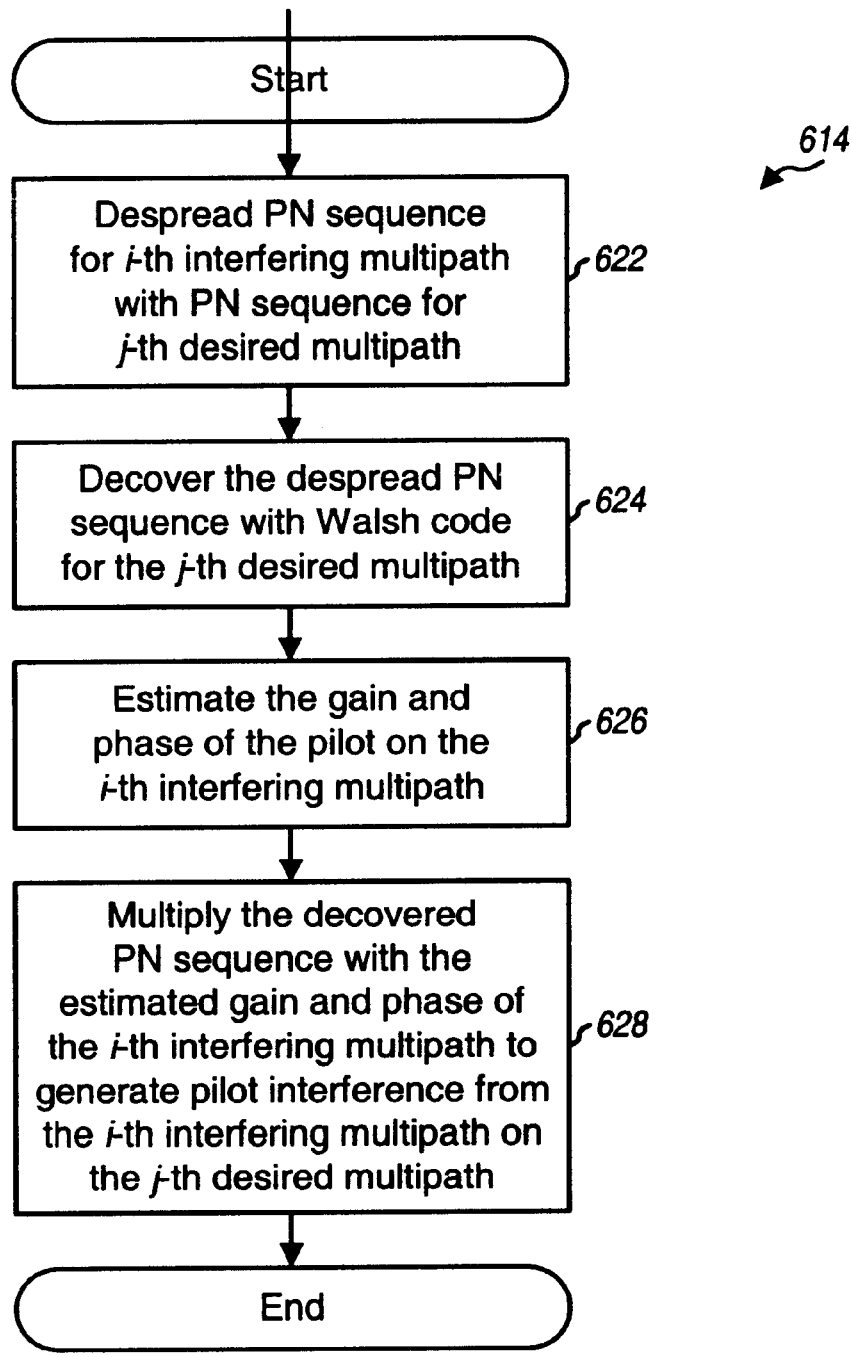
FIG. 6B is a flow diagram of a process to estimate the pilot interference from an i-th interfering multipath on a j-th desired multipath.

FIG. 6B is a flow diagram of a process to estimate the pilot interference from an i-th interfering multipath on the j-th desired multipath, in accordance with an embodiment of the invention. Initially, the PN sequence, $q(t-t_i)$, for the i-th interfering multipath is despread with the PN sequence, $q^*(t-t_j)$, for the j-th desired multipath, at step 622. The result of the despreading is the fast pilot interference component, $z_{pint,fast,i,j}(t)$. The despread PN sequence for the interfering i-th multipath may further be decovered with the Walsh code, $W_j$, for the code channel to be recovered on the desired multipath, at step 628.

The gain and phase of the pilot on the i-th interfering multipath are also estimated, at step 626, to provide the slow pilot interference component, $z_{pint,slow,i}(t)$. This may be achieved by filtering the pilot on the i-th multipath with a pilot filter, as described above. The decovered PN sequence for the i-th interfering multipath (i.e., the decovered fast pilot interference component, $z_{pint,fast,i,j}(t)$) is then multiplied with the estimated gain and phase of the i-th interfering multipath (i.e., the slow pilot interference component, $z_{pint,slow,i}(t)$) to generate the pilot interference, $z_{pint,i,j}(t)$, from the i-th interfering multipath on the j-th desired multipath.

Figure 7:
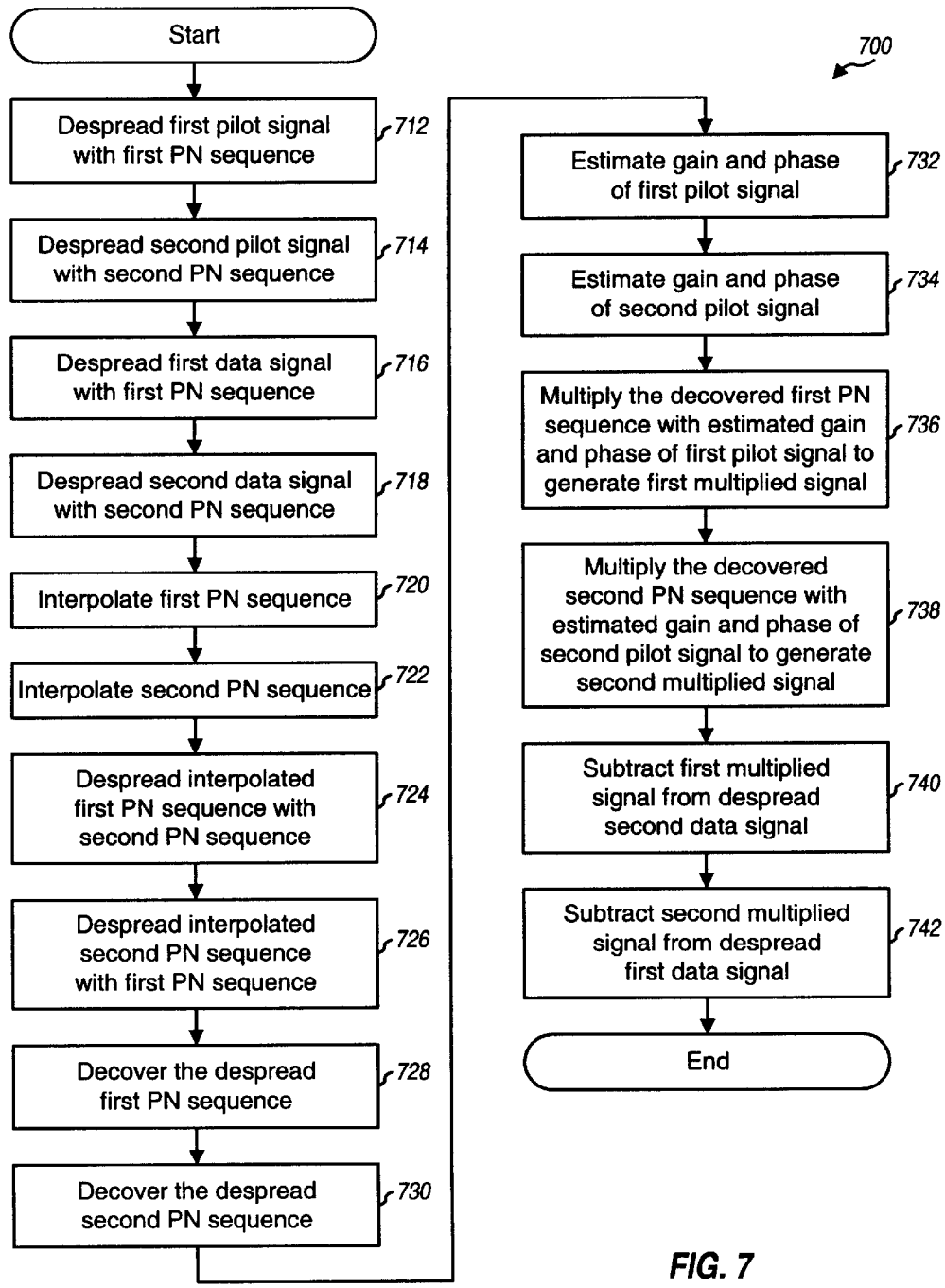
FIG. 7 is a flow diagram of a process to estimate and cancel pilot interference for two multipaths, in accordance with a specific embodiment of the invention.

FIG. 7 is a flow diagram of a process 700 to estimate and cancel pilot interference for two multipaths, in accordance with a specific embodiment of the invention. Process 700 may be used if the conditioned signal s(t) is sampled by different sampling clocks to generated sample streams with different sample timing for the two finger processors. Process 700 may also be implemented by the rake receivers shown in FIGS. 4 and 5A.

Initially, the pilot in a first multipath (or a first pilot signal) is despread with a first PN sequence for the first multipath (e.g., by PN despreader 422a in FIG. 4), at step 712. Similarly, the pilot in a second multipath (or a second pilot signal) is despread with a second PN sequence for the second multipath (e.g., by PN despreader 422b), at step 714. Data in the first multipath (or a first data signal) is also despread with the first PN sequence (e.g., also by PN despreader 422a), at step 716. Similarly, data in the second multipath (or a second data signal) is despread with the second PN sequence (e.g., also by PN despreader 422b), at step 718. Steps 712 through 718 correspond to typical despreading of the data and pilot in each of two finger processors of a rake receiver.

The first PN sequence is interpolated based on the sample timing of the second PN sequence (e.g., by interpolator 594 in FIG. 5C), at step 720. Similarly, the second PN sequence is interpolated based on the sample timing of the first PN sequence, at step 722. Interpolation may be performed to generate PN sequences with the proper sample timing for each finger processor, if different sampling clocks are used for different finger processors. The interpolated first PN sequence is then despread with the second PN sequence (e.g., by despreader 442b), at step 724. Similarly, the interpolated second PN sequence is despread with the first PN sequence (e.g., by despreader 442a), in step 726. The despread first PN sequence is then decovered with the Walsh code assigned to the code channel being recovered (e.g., by data decoverer 444b and accumulator 446b), at step 728. Similarly, the despread second PN sequence is decovered with the Walsh code (e.g., by data decoverer 444a and accumulator 446a), at step 730.

The gain and phase of the first pilot signal is also estimated (e.g., by pilot filter 428a), at step 732. Similarly, the gain and phase of the second pilot signal is estimated (e.g., by pilot filter 428b), at step 734. The decovered first PN sequence (from step 728) is then multiplied (e.g., by multiplier 448b) with the estimated gain and phase of the first pilot signal (from step 732) to generate a first multiplied signal, at step 736. Similarly, the decovered second PN sequence (from step 730) is multiplied (e.g., by multiplier 448a) with the estimated gain and phase of the second pilot signal (from step 734) to generate a second multiplied signal, at step 738.

The first multiplied signal (from step 736) is then subtracted (e.g., by adder 438b) from the despread second data signal (from block 718) to cancel the pilot interference from the second data signal, at step 740. Similarly, the second multiplied signal (from step 738) is subtracted (e.g., by adder 438a) from the despread first data signal (from step 716) to cancel the pilot interference from the first data signal, at step 742. The process then terminates.

In a typical multipath or handoff scenario, the pilot interference cancellation techniques described herein may provide an interference reduction of about 20% when CDMA interference (i.e., intra-cell and inter-cell interference) is the dominant source of interference. A 20% interference reduction is significant improvement since it may improve the signal-to-total-noise-plus-interference ratio (SNIR) or the energy-per-bit over spectral noise density ($E_b/N_t$) by approximately 1 dB.

The improvement in SNIR gained by using the techniques described herein can be shown mathematically. In the mathematical derivation, the following assumptions are made: (1) the finger processors are assigned to separate multipaths that fade independently with Rayleigh (or Ricean) distributed amplitude, (2) maximal-ratio combining of the demodulated symbols from the assigned finger processors is perfect, (3) the pilot is transmitted with an energy-per-chip over noise power spectral density ($E_c/I_{or}$) of −7 dB, and (4) the pilot interference is cancelled completely (e.g., estimation of gain and phase of the multipaths by the pilot filters is perfect, and the PN sequences are generated with the exact time offsets).

First, the following quantity is defined as:

$$\hat{I}_{or} W = E\left\{\sum_j P_j\right\} \quad \text{Eq (14)}$$

where $\hat{I}_{or}$ is the average power spectral density of the received signal;

W is the bandwidth of interest (e.g., 1.2288 MHz for IS-95);

$P_j$ is the received power of the j-th resolvable multipath, which is a random variable; and E{} is the expectation operator.

The received SNIR for a typical CDMA system using direct sequence spread spectrum (DSSS) and orthogonal Walsh codes, without the benefit of pilot interference cancellation, can be expressed as:

$$\frac{C}{N_t} = \sum_j \left( \frac{P_j}{\frac{I_{oc}}{\hat{I}_{or}} E\left\{\sum_k P_k\right\} + \sum_{k \neq l} P_k} \right). \quad \text{Eq (15)}$$

The received SNIR for a CDMA system using DSSS and orthogonal Walsh codes, and further employing the pilot interference cancellation techniques described herein, can be expressed as:

$$\frac{C}{N_t} = \sum_j \left( \frac{P_j}{\frac{I_{oc}}{\hat{I}_{or}} E\left\{\sum_k P_k\right\} + \left(1 - \frac{E_{c,pilot}}{I_{or}}\right) \sum_{k \neq j} P_k} \right), \quad \text{Eq (16)}$$

where $E_{c,pilot}$ is the energy-per-chip of the pilot.

In comparing equation (15) to equation (16), the fraction of the received power belonging to the interfering pilots (i.e., $E_{c,pilot}/I_{or}$) has been removed, as shown in the rights term in the denominator in equation (16). Cancellation of this pilot interference can increase the SNIR.

The pilot interference cancellation techniques described herein may be advantageously used in a rake receiver or demodulator architecture having a number of parallel processing paths, such as that described in the aforementioned U.S. Pat. No. 5,764,687. The rake receiver architecture described in the U.S. Pat. No. 5,764,687 includes three larger finger processors and one smaller finger processor. Each larger finger processor includes a number of parallel processing paths that support despreading of up to eight multipaths (for up to eight data channels). The smaller finger processor supports despreading of one multipath for one data channel.

In the architecture described in the '687 patent, the three larger finger processors are capable of implementing the pilot interference cancellation without additional processing paths for interference despreaders 442 shown in FIG. 4. The capability to despread up to eight multipaths may be used to implement the pilot interference cancellation. The fourth finger processor may be used to feed the other three finger processors with the PN sequence needed to cancel the pilots from the interference multipaths.

The amount of pilot interference cancellation achieved by each of the parallel processing paths may be dependent on the data rate of the signal of interest. When the data rate is high, more of the parallel processing paths may be used to demodulate the multipaths of interest in order to improve efficiency. And when the data rate is low, more of the parallel processing paths may be used to perform pilot interference cancellation. Thus, in one embodiment, as the data rate increases, interference despreaders 442 are used for data processing as described in the U.S. Pat. No. 5,764,687 and are not used for pilot interference cancellation. The pilot interference cancellation techniques described herein may also be implemented in other rake receiver designs and demodulator architectures.

For clarity, various aspects and embodiments of the invention have been described for the forward link in IS-95. The pilot interference cancellation techniques described herein may also be used for a reverse link transmission from the terminal to the base station. Moreover, these techniques may also be used for other CDMA systems (e.g., cdma2000 and W-CDMA) and possibly for other wireless communication systems. For these other CDMA systems, the processing by the finger processors is determined by the particular CDMA standard being supported. For example, the "despreading" by PN despreader 442 for IS-95 and cdma2000 would be replaced by "descrambling" with a scrambling sequence in W-CDMA, and the "decovering" by data decoverer 444/accumulator 446 for IS-95 and cdma2000 would be replaced by "despreading" with an OVSF code in W-CDMA. In general, the processing performed by the finger processors is complementary to that performed by the transmitter unit.

The techniques described herein may also be used to approximately cancel other pilot channels that may be transmitted in addition to, or possibly in place of, the "common" pilot channel transmitted to all terminals in a cell. For example, cdma2000 supports a "transmit diversity" pilot channel and an "auxiliary" pilot channel. These other pilot channels may utilize different Walsh codes (i.e., different channelization codes, which may be quasi-orthogonal functions). A different data pattern may also be used for the pilot channel. To process any of these pilot channels, the despread samples are decovered with the same Walsh code used to channelize the pilot at the base station, and further correlated (i.e., multiplied and accumulated) with the same pilot data pattern used at the base station for the pilot channel. These functions may be performed by pilot decoverers 324, 424, and 524 and symbol accumulators 326, 426, and 526. The processing and cancellation of the transmit diversity pilot and/or auxiliary pilot may be performed in addition to that for the common pilot channel.

Similarly, W-CDMA supports a number of different pilot channels. First, a common pilot channel (CPICH) may be transmitted on a primary base station antenna. Second, a diversity CPICH may be generated based on non-zero pilot data and transmitted on a diversity antenna of the base station. Third, one or more secondary CPICHs may be transmitted in a restricted part of the cell, and each secondary CPICH is generated using a non-zero channelization code. Fourth, the base station may further transmit a dedicated pilot to a specific user using the same channelization code as the user's data channel. In this case, the pilot symbols are time-multiplexed with the data symbols to that user.

Thus, it will be understood by those skilled in the art that the techniques described herein are applicable for processing all of the above different types of pilot channels, and other pilot channels that may also be transmitted in a wireless communication system.

The rake receiver and supporting circuitry (e.g., the PN generator) described herein may be implemented in hardware, software, firmware, or a combination thereof. For a hardware design, the rake receiver may be implemented within a digital signal processor (DSP), an application specific integrated circuit (ASIC), a processor, a microprocessor, a controller, a microcontroller, a field programmable gate array (FPGA), a programmable logic device, other electronic unit, or any combination thereof. And for a software or firmware design, the rake receiver may be implemented with codes executed by a processor (e.g., controller 260). Various structures and implementations of the rake receiver and supporting circuitry are possible and within the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for canceling pilot interference at a receiver unit that receives first and second pilot signals and first and second data signals, comprising:

generating a first PN sequence corresponding to the first pilot signal;

despreading the first PN sequence with a second PN sequence corresponding to the second pilot signal;

multiplying the despread first PN sequence with an estimated gain and phase of the first pilot signal to generate a first multiplied signal; and subtracting the first multiplied signal from the second data signal.

2. The method of claim 1, further comprising:

despreading the second PN sequence with the first PN sequence;

multiplying the despread second PN sequence with an estimated gain and phase of the second pilot signal to generate a second multiplied signal; and subtracting the second multiplied signal from the first data signal.

3. The method of claim 2, further comprising:

receiving a modulated signal comprised of a plurality of signal instances, wherein a first signal instance includes the first pilot signal and the first data signal and a second signal instance includes the second pilot signal and the second data signal.

4. The method of claim 2, further comprising:

decovering each of the first and second despread PN sequence, wherein the decovering for each despread PN sequence includes multiplying the despread PN sequence with a channelization code, and accumulating the multiplied PN sequence over an integer multiple of a channelization code length.

5. A system for canceling pilot interference in a receiver unit that receives first and second pilot signals and first and second data signals, comprising:

a first PN generator configured to generate a first PN sequence corresponding to the first pilot signal;

a first despreader configured to despread the first PN sequence with a second PN sequence corresponding to the second pilot signal;

a first multiplier configured to multiply the despread first PN sequence with an estimated gain and phase of the first pilot signal to generate a first multiplied signal; and a first adder configured to subtract the first multiplied signal from the second data signal.

6. The system of claim 5, further comprising:

a second PN generator configured to generate the second PN sequence;

a second despreader configured to despread the second PN sequence with the first PN sequence;

a second multiplier configured to multiply the despread second PN sequence with an estimated gain and phase of the second pilot signal to generate a second multiplied signal; and a second adder configured to subtract the second multiplied signal from the first data signal.

7. The system of claim 6, further comprising:

a first decoverer configured to decover the despread first PN sequence; and a second decoverer configured to decover the despread second PN sequence.

8. The system of claim 7, wherein each of the first and second decovers includes a multiplier configured to multiply the despread PN sequence with a channelization code, and an accumulator configured to accumulate the multiplied PN sequence over a channelization code length.

9. In a wireless communication system, a pre-processor for canceling pilot interference in a receiver unit that receives first and second pilot signals and first and second data signals, comprising:

a first PN generator configured to generate a first PN sequence corresponding to the first pilot signal;

a second PN generator configured to generate a second PN sequence corresponding to the second pilot signal; and a first despreader configured to despread the first PN sequence with the second PN sequence corresponding to the second pilot signal.

10. The pre-processor of claim 9, further comprising:

a second despreader configured to despread the second PN sequence with the first PN sequence.

11. The pre-processor of claim 10, further comprising:

a first decoverer configured to decover the despread first PN sequence; and a second decoverer configured to decover the despread second PN sequence.

* * * * *